US010744633B2

(12) United States Patent
Yoshinari et al.

(10) Patent No.: US 10,744,633 B2
(45) Date of Patent: Aug. 18, 2020

(54) POWER TOOL

(71) Applicant: Hitachi Koki Co., Ltd., Tokyo (JP)

(72) Inventors: Takuya Yoshinari, Hitachinaka (JP);
Yoshikazu Kawano, Hitachinaka (JP);
Kazuhiko Funabashi, Hitachinaka (JP);
Toshiaki Koizumi, Hitachinaka (JP)

(73) Assignee: Koki Holdings Co., Ltd., Tokyo (JP)

( * ) Notice: Subject to any disclaimer, the term of this patent is extended or adjusted under 35 U.S.C. 154(b) by 13 days.

(21) Appl. No.: 15/749,003

(22) PCT Filed: Jun. 27, 2016

(86) PCT No.: PCT/JP2016/068989
§ 371 (c)(1),
(2) Date: Jan. 30, 2018

(87) PCT Pub. No.: WO2017/022361
PCT Pub. Date: Feb. 9, 2017

(65) Prior Publication Data
US 2019/0001479 A1    Jan. 3, 2019

(30) Foreign Application Priority Data

Jul. 31, 2015 (JP) ................................ 2015-152277

(51) Int. Cl.
*B25F 5/02* (2006.01)
*H02K 11/28* (2016.01)
(Continued)

(52) U.S. Cl.
CPC ................. *B25F 5/02* (2013.01); *B25F 5/00* (2013.01); *H02K 11/28* (2016.01); *H02P 3/18* (2013.01);
(Continued)

(58) Field of Classification Search
CPC .............. B25F 5/02; H02K 11/28; H02P 3/18
See application file for complete search history.

(56) References Cited

U.S. PATENT DOCUMENTS 6,182,723 B1 * 2/2001 Bosten ..................... B27C 5/10
144/136.95
2004/0155529 A1 8/2004 Brotto et al.
(Continued)

FOREIGN PATENT DOCUMENTS

DE    202014008083 U1    11/2014
DE    102014015410 A1    4/2015
(Continued)

OTHER PUBLICATIONS

International Report on Patentability for application PCT/JP2016/068989 (Feb. 6, 2018), 5 pages.
(Continued)

*Primary Examiner* — Cortez M Cook
(74) *Attorney, Agent, or Firm* — Kilpatrick Townsend & Stockton LLP

(57) ABSTRACT

In order to provide a tool in which a motor is assuredly prevented from being restarted when power is turned on again after a power supply interruption due to a contingency, a disk grinder 1 includes a motor 2 and a switch 12 switchable between an ON position at which the motor is driven by an operator and an OFF position at which the motor is stopped. Furthermore, first and second restart prevention means 60, 90 are provided to disable driving of the motor until the switch is turned again to the ON position when power supplied to the motor 2 falls below or under a predetermined value.

10 Claims, 9 Drawing Sheets

(51) Int. Cl.
*H02P 3/18* (2006.01)
*B25F 5/00* (2006.01)
*H02P 27/06* (2006.01)
*B24B 23/02* (2006.01)
*B24B 47/12* (2006.01)
*H02M 7/5387* (2007.01)

(52) U.S. Cl.
CPC ............ *H02P 27/06* (2013.01); *B24B 23/02* (2013.01); *B24B 47/12* (2013.01); *H02M 7/5387* (2013.01)

(56) References Cited

U.S. PATENT DOCUMENTS

2004/0155532 A1   8/2004   Brotto et al.
2014/0104739 A1*  4/2014   Nakamoto ........ H01M 10/0525
                                                    361/160
2016/0293369 A1  10/2016   Fiederer et al.

FOREIGN PATENT DOCUMENTS

| | | |
|---|---|---|
| EP | 1777792 A2 | 4/2007 |
| EP | 2886262 A2 | 6/2015 |
| JP | 58-132678 U | 9/1983 |
| JP | 60-174079 A | 9/1985 |
| JP | 08-336779 A | 12/1996 |
| JP | 2006-518181 A | 8/2006 |
| JP | 2015-93330 A | 5/2015 |

OTHER PUBLICATIONS

European Patent Office Extended Search for EP16832640.3 dated Apr. 11, 2019, 8 pages.
International Search Report for international application PCT/JP2016/068989 (dated Sep. 13, 2016) 9 pages with translation.

* cited by examiner

POWER TOOL

TECHNICAL FIELD

This invention relates to a power tool.

BACKGROUND ART

A conventional power tool includes a restart prevention function. When power fails or the electric tool is unplugged during work, power supply to the motor of the electric tool is stopped. After that, when the power is supplied again, the restart prevention function prevents the restart of the motor unless a switch is once turned off and then turned on again.

CITATION LIST

Patent Literature

Patent Literature 1: Japanese Patent Application Publication Hei8-336779

SUMMARY OF INVENTION

Technical Problem

The conventional power tool, however, causes a program of a microcomputer of the body of the power tool to achieve the restart prevention function. Thus, the restart prevention function may be deactivated during its operation due to external factors, such as external noise and surge current, or malfunction of the microcomputer.

In view of the above-described problem, an object of the present invention is to provide a tool which reliably achieves the restart prevention function.

Solution to Problem

The present invention provides a power tool including: a motor; a switch switchable between an ON position and an OFF position by an operator, the ON position causing the motor to be driven, the OFF causing the motor to be stopped; and first and second restart prevention means for preventing the motor from being driven until the switch is switched again to the ON position in a case where power supplied to the motor falls below or to a predetermined value.

With the above structure, when power supply is cut off to stop the motor while the switch is the ON position due to power failure or unplugging of a plug, and then power supply is restarted by connecting the power tool to a power source again, the first and second restart means maintain stopping the motor until the switch is returned to the ON position by the operator, that is, the switch is turned to off and then turned on again. By having two restart prevention means, if one of two restart prevention means breaks down, the other of two restart prevention means stops the drive of the motor. Accordingly, the restart of the motor is reliably prevented.

It is preferable that the power tool further includes on-lock means for maintaining the switch to the ON position. With this structure, when the power source is cut off to stop the motor while the switch is locked to the ON position, the stop condition of the motor is maintained until the on-lock condition of the switch is released to turn the switch to the OFF position, and then the switch is turned again to the ON position by the operator. Accordingly, the restart of the motor is reliably prevented.

It is preferable that the first restart prevention means comprises a microcomputer for controlling driving of the motor. The microcomputer for controlling the rotation of the motor has a restart prevention function for stopping the driving of the motor until the switch is turned again to the ON position when the power to be supplied to the motor falls below or to a predetermined value. Accordingly, the power tool having the restart prevention function can be made compact.

It is preferable that the second restart prevention means comprises a switch unit physically integrated with the switch, the switch unit comprising a switching element connected in series with a current path to the motor, the switching element turning on and off power supply to the motor. By turning off the switching element, the power supply to the motor is stopped until the switch is turned again to the ON position.

The switch unit has the restart prevention means for the switching element. If a conventional switching unit is replaced with the switching unit of the present invention, the restart prevention function can be easily added to the power tool.

It is preferable that the second restart prevention means comprises a microcomputer provided internally of the switch unit. With this structure, the microcomputer in the switch unit has a restart prevention function. Therefore, the power tool having the restart prevention function can be made compact.

It is preferable that the second restart prevention means is provided on an input side of a power generation circuit for generating power to be supplied to the microcomputer, and power supply to the power generation circuit is stopped until the switch is turned again to the ON position.

With the above structure, when the power source is cut off, the feeding power to the microcomputer is stopped and the microcomputer is disabled. Since the driving of the motor is stopped until power supply to the power generation circuit is restarted by the operator, the restart of the motor is prevented.

It is preferable that power tool further has an inverter circuit for outputting power to the motor. The switch includes a first switch and a second switch, the first switch being switchable between an ON position at which power supply to the inverter circuit is allowed and an OFF position at which the power supply to the inverter circuit is stopped, the second switch being switchable between an ON position at which operation of the microcomputer is allowed and an OFF position at which the operation of the microcomputer is not allowed. The microcomputer controls power supply from the inverter circuit to the motor to control driving of the motor. The second restart prevention means stops power supply to the power generation circuit until the second switch is turned again to the ON position.

With the above structure, in a normal operation mode, the first switch and the second switch are interlocked to each other to drive or stop the motor. Further, even if the first switch is at the ON position after the power source is cut off, the power supply to the power generation circuit is stopped until the second switch is turned again to the ON position. Accordingly, the restart is reliably prevented.

It is preferable that a power tool has: a motor; an inverter circuit for outputting power to the motor; a microcomputer for controlling the inverter circuit; a first switch switchable between an ON position and an OFF position by an operator, the ON position being for allowing power supply to the inverter circuit, the OFF position being for stopping the power supply to the motor; a second switch switchable between an ON position and an OFF position by an operator, the ON position being for allowing operation of the microcomputer, the OFF position being for stopping the operation of the microcomputer; on-lock means for maintaining the first switch on the ON position; and restart prevention means for stopping the power supply to the microcomputer until the first switch is turned again to the ON position, when power supplied to the motor falls below or to a predetermined value.

With the above structure, in a normal operation mode, the first switch and the second switch are interlocked to each other to drive or stop the motor. Further, even if the second switch is at the ON position after the power source is cut off, the power supply to the microcomputer is stopped until the first switch is turned again to the ON position. Accordingly, the restart of the motor after resuming the power supply is reliably prevented.

It is preferable that the power tool further has a power generation circuit for supplying power to the microcomputer. The second switch is provided between the power generation circuit and the microcomputer. The restart prevention means stops power supply from the power generation circuit to the microcomputer until the second switch is turned again to the ON position.

With the above structure, the power supply to the power generation circuit is stopped until the second switch is turned again to the ON position. Accordingly, the restart of the motor after resuming the power supply is reliably prevented.

The present invention provides a power tool having: a motor; a switch switchable between an ON position and an OFF position, the ON position enabling the motor to drive, the OFF position stopping the motor; switch detection means for detecting that the switch is in the ON position; power feeding detection means for detecting power feed to the motor; a microcomputer for controlling the motor; and restart prevention means for preventing the motor from driving until the switch is turned again to the ON position, when power supplied to the motor falls below or to a predetermined value. The restart prevention means includes a first time constant and a second time constant, the first time constant relating to detection of the power feed, the second time constant relating to detection that the switch is in the ON position. The restart prevention means starting activation of the microcomputer by means of the first time constant when only the power feed is detected. The restart prevention means adopts the second time constant in preference to the first time constant to block activation of the microcomputer.

With the above structure, when power supply is restarted after the power source is cut off, the switch detection means prevents the activation of the microcomputer in preference to the power feeding detection means. Accordingly, the activation of the motor is reliably prevented.

It is preferable that the power tool further includes on-lock means for maintaining the switch to the ON position.

With the above structure, when the power source is cut off to stop the motor while the switch being locked at the ON position, the stop condition of the motor is maintained until the on-lock condition of the switch is released, turned to the OFF position, and then turned again to the ON position by the operator. Accordingly, the restart of the motor is reliably prevented.

Effects of Invention

The power tool of the present invention exhibits advantageous effects that the drive of the motor is reliably prevented until the switch is turned again to the ON position after the power supply to the motor is cut off due to an accidental event and then the power supply to the power tool is restarted.

DESCRIPTION OF EMBODIMENTS

Figure 1:
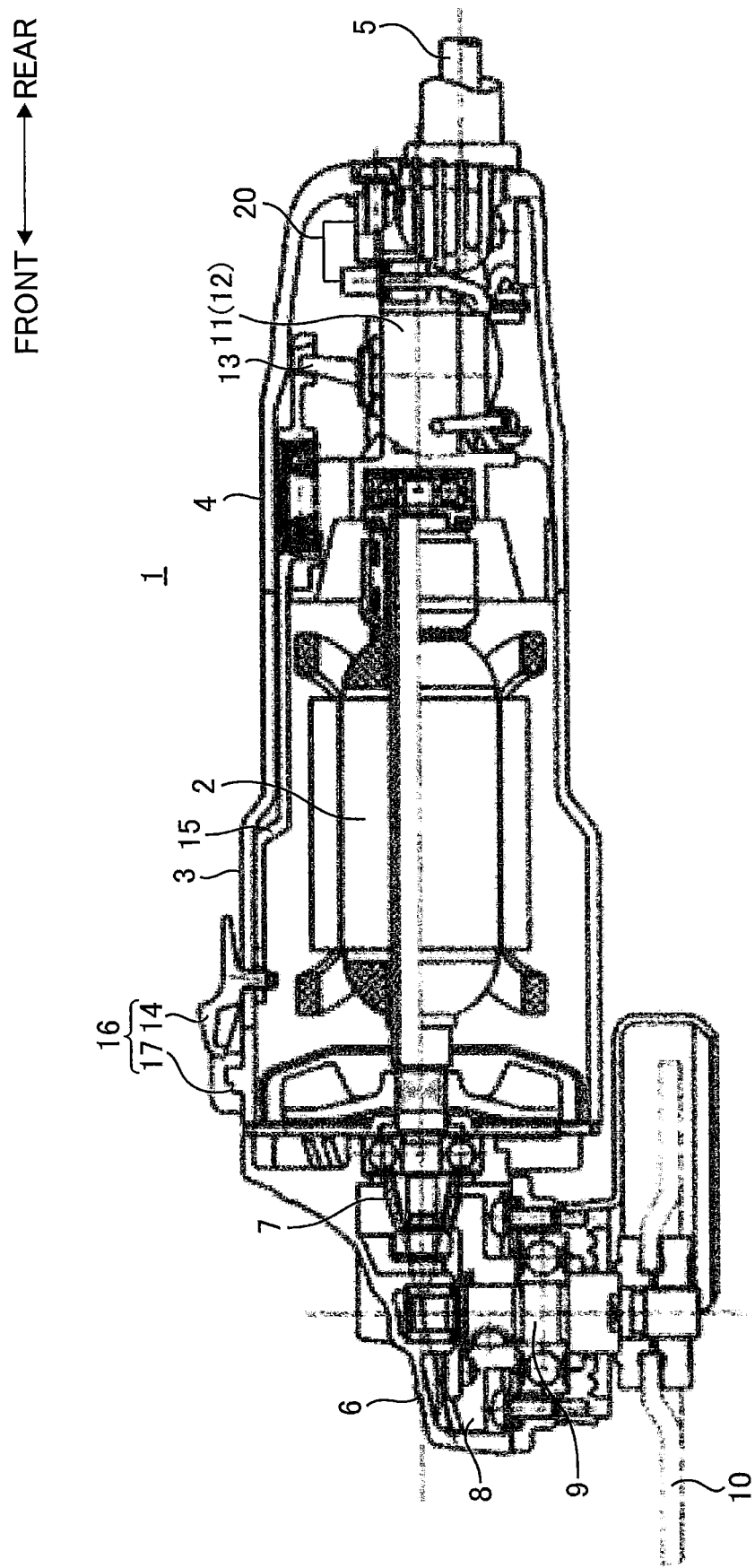
[FIG. 1] A cross sectional view illustrating an overall structure of a disk grinder of an embodiment according to the present invention and a condition in which a switch is in an off position.

Hereinafter, some embodiments of the present invention will be described with reference to the accompanying drawings. In the drawings described below, an identical component is given an identical symbol and the detailed description thereof will be omitted. In the description for the drawings, a front-rear direction and a vertical direction are directions indicated in the drawings.

As illustrated in FIG. 1, a disk grinder 1, which is one example of electric tools, includes a cylindrical motor housing 3 which houses a motor 2. A tail cover 4 which can be divided in a right-left direction is provided behind the motor housing 3. The tail cover is coupled with a power cord 5, which is used to supply power to the motor 2 from the outside. In the front of the motor housing 3, a gear cover 6 is provided. The gear cover 6 houses a power transmission mechanism, which includes two sets of bevel gears 7 and 8 used to change a power transmission direction generated by the rotation of the motor 2 by about 90 degrees. The bevel gear 8 is coupled with a spindle 9, which extends downward from the gear cover 6. A grindstone 10 is attached to the leading end of the spindle 9.

In the interior of the tail cover 4, a switch unit 11 is provided to turn on and off the motor 2. The switch unit 11 includes a switch 12, a swing lever 13, a switch lever 14, an operation rod 15, and an on-lock mechanism 16. The on-lock mechanism 16 is used to keep the switch lever 14 in an ON state. When the switch 12 is turned on, power supply to the motor 2 via the power cord 5 is enabled. Here, the on-lock mechanism 16 is one example of on-lock means.

The operation rod 15 extends rearward from the switch lever 14, and engages with the lever 13 to move the lever 13. When the lever 13 is moved frontward by the switch lever 14 via the operation rod 15, the switch 12 is turned to the ON state. On the other hand, when the lever 13 is moved backward by the switch lever 14 via the operation rod 15, the switch 12 is turned to an OFF state.

Figure 2:
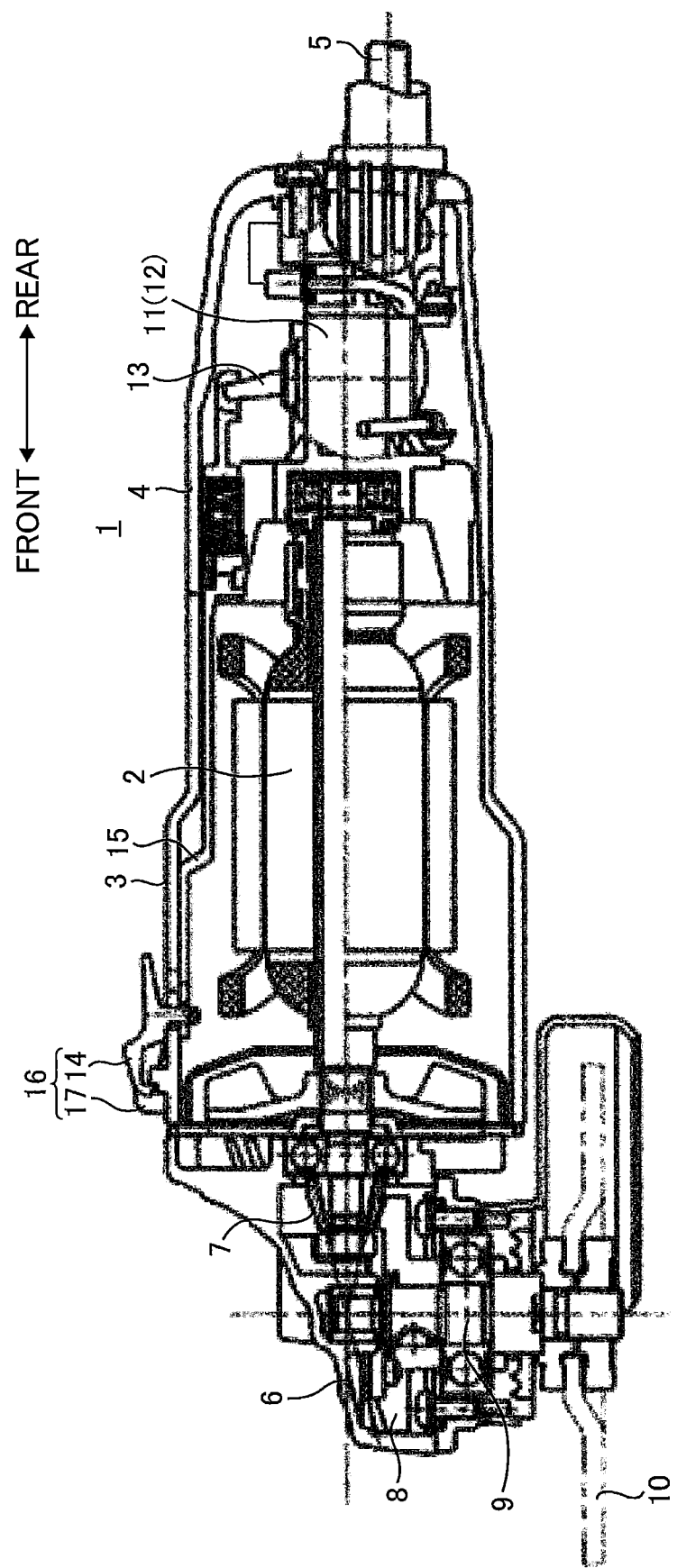
[FIG. 2] A cross sectional view illustrating an overall structure of a disk grinder of an embodiment according to the present invention and a condition in which a switch is in an on-lock position.

The on-lock mechanism 16 includes the switch lever 14 and an engagement portion 17 formed on the outer peripheral surface of the motor housing 3. As illustrated in FIG. 2, when the leading end portion of the switch lever 14 becomes engaged with the engagement portion 17, the engagement portion 17 keeps the switch 12 in an on-lock state.

Further, at the rear end portion of the tail cover 4, a motor control unit 18 is provided to control drive of the motor 2.

Next, a first embodiment of a circuit configuration of the disk grinder 1 will be described with reference to FIG. 3.

Figure 3:
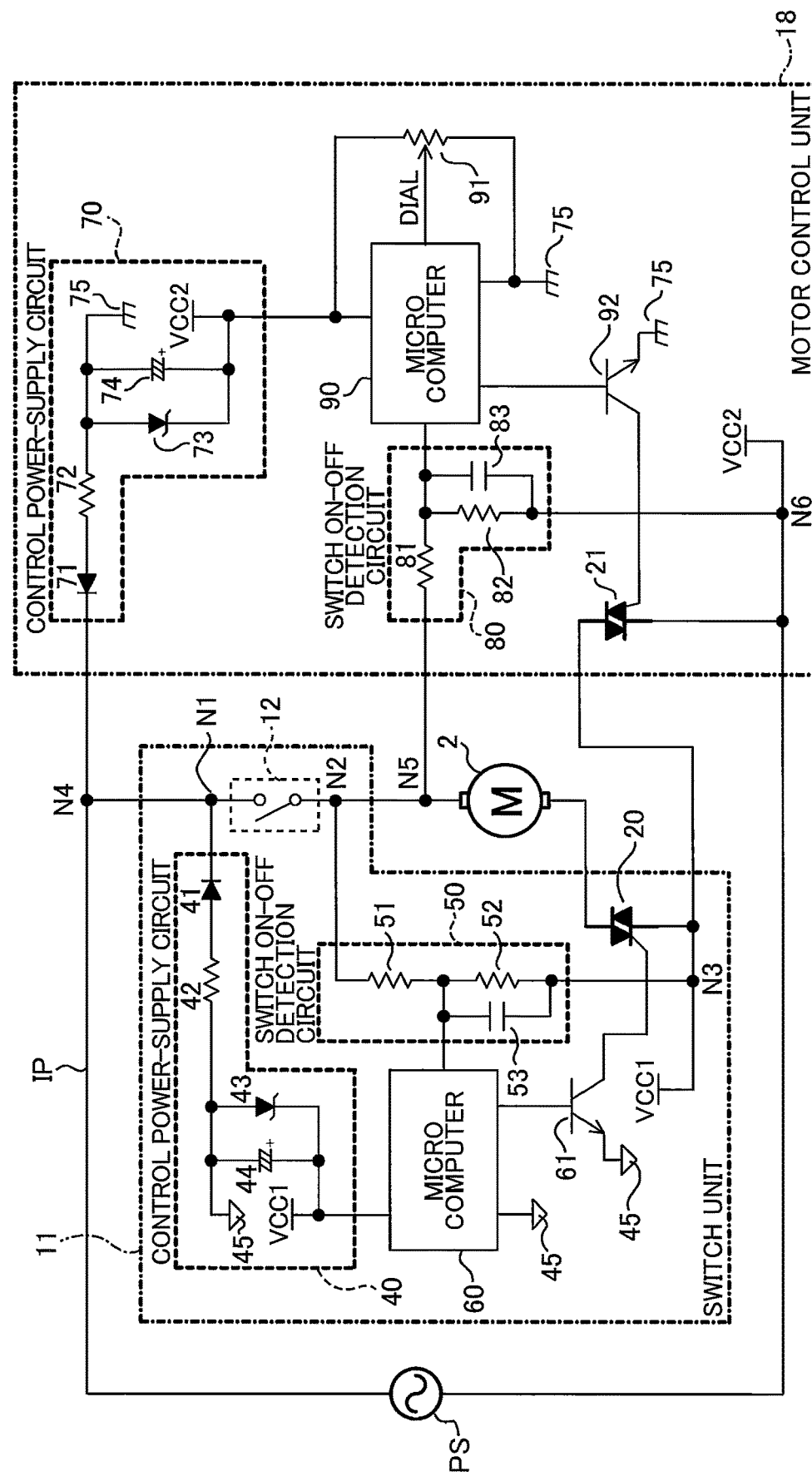
[FIG. 3] A circuit diagram illustrating an electric structure of the disk grinder of a first embodiment according to the present invention.

As illustrated in FIG. 3, a commercial power supply PS, the switch unit 11, and the motor 2 are connected in series to form a current path IP for the motor 2. The commercial power supply PC serves as a power supply. The motor 2 is connected to the motor control unit 18, which controls the rotation of the motor 2.

The switch unit 11 includes the switch 12, a switching element 20, a control power-supply circuit 40, a switch-on-and-off detection circuit 50, and a microcomputer 60.

The switching element 20 is constituted by a triac. The switch 12, the motor 2, and the switching element 20 are connected in series in this order to form the current path IP including the commercial power supply PS.

The control power-supply circuit 40 includes a diode 41, a resistor 42, a zener diode 43, and a capacitor 44. The cathode of the zener diode 43 is connected to a power supply Vcc1 and the microcomputer 60. The anode of the zener diode 43 is connected to a first reference potential 45, and to the anode of the diode 41 via the resistor 42. The cathode of the diode 41 is connected to a node N1 in the current path IP. The zener diode 43 is connected in parallel to the capacitor 44. When a voltage equal to or larger than a breakdown voltage of the zener diode 43 is applied between Vcc1 and the first reference potential 45, the zener diode 43 supplies a constant-voltage power to the microcomputer 60. Thus, the control power-supply circuit 40 operates as a power supply circuit for the microcomputer 60.

The switch-on-and-off detection circuit 50 includes resistors 51 and 52, and a capacitor 53. The resistors 51 and 52 are connected in series. In addition, the series-connected resistors 51 and 52 are connected in parallel to the motor 2 between nodes N2 and N3. The capacitor 53 is connected in parallel with the resistor 52. During the drive of the motor 2, the switch-on-and-off detection circuit 50 outputs a divided voltage value of a motor voltage to the microcomputer 60. The switch-on-and-off detection circuit 50 detects the motor voltage to determine the ON and OFF states of the switch 12.

The microcomputer 60 can operate as a restart prevention means when the power is supplied from the control power-supply circuit 40. The microcomputer 60 determines the ON or OFF state of the switch 12 in response to the output signal from the switch-on-and-off detection circuit 50, and then controls the ON and OFF state of the switching element 20 by means of a transistor 61 in accordance with a result of the determination.

The motor control unit 18 includes a switching element 21, a control power-supply circuit 70, a switch-on-and-off detection circuit 80, and a microcomputer 90.

The switching element 21 is constituted by a triac, and connected in series with the switching element 20 of the switch unit 11 in the current path IP.

The control power-supply circuit 70 includes a diode 71, a resistor 72, a zener diode 73, and a capacitor 74. The cathode of the zener diode 73 is connected to a power supply Vcc2 and the microcomputer 90. The anode of the zener diode 73 is connected to a second reference potential 75, and to the anode of the diode 71 via the resistor 72. The cathode of the diode 71 is connected to a node N4 in the current path IP. The zener diode 73 is connected in parallel with the capacitor 74. When a voltage equal to or larger than a breakdown voltage is applied between Vcc2 and the second reference potential 75, the zener diode 73 supplies a constant-voltage power to the microcomputer 90. Thus, the control power-supply circuit 70 operates as a power supply circuit for the microcomputer 90.

The switch-on-and-off detection circuit 80 includes resistors 81 and 82, and a capacitor 83. The resistors 81 and 82 are connected in series. In addition, the series-connected resistors 81 and 82 are connected in parallel with the motor 2 between nodes N5 and N6. The capacitor 83 is connected in parallel with the resistor 82. During the drive of the motor 2, the switch-on-and-off detection circuit 80 outputs the divided voltage value of a motor voltage to the microcomputer 90. The switch-on-and-off detection circuit 80 detects the motor voltage to determine ON and OFF states of the switch 12.

The microcomputer 90 is connected to the second reference potential 75, and can operate as a restart prevention means when the power is supplied from the control power-supply circuit 70 to the microcomputer 90. The microcomputer 90 determines the ON or OFF state of the switch 12 in response to the output signal from the switch-on-and-off detection circuit 80. In addition, the microcomputer 90 sets a conduction angle of the motor 2 when a user (worker) operates a dial 91. The microcomputer periodically switches the ON and OFF states of the switching element 21 by means of a transistor 92 having an emitter connected to the second reference potential 75, and then controls the rotation of the motor 2.

Next, an operation of the disk grinder 1 will be described.

The disk grinder 1 can rotate to process a workpiece when the switch 12 and the switching elements 20 and 21 are all turned on to start the power feeding to the motor 2.

Here, the restart prevention function operates as follows. When the power feeding from the commercial power supply PS to the motor 2 is shut off because of power failure or unplugging of the power cord 5, and then the power is supplied again while the switch 12 is still in the ON state, the restart prevention function prevents the restart of the motor 2 regardless of the ON state of the switch 12. That is, the restart prevention shuts off the power feeding to the motor 2 and prevents the restart of the motor 2, unless the switch 12 is once turned off and then turned on again.

Figure 4:
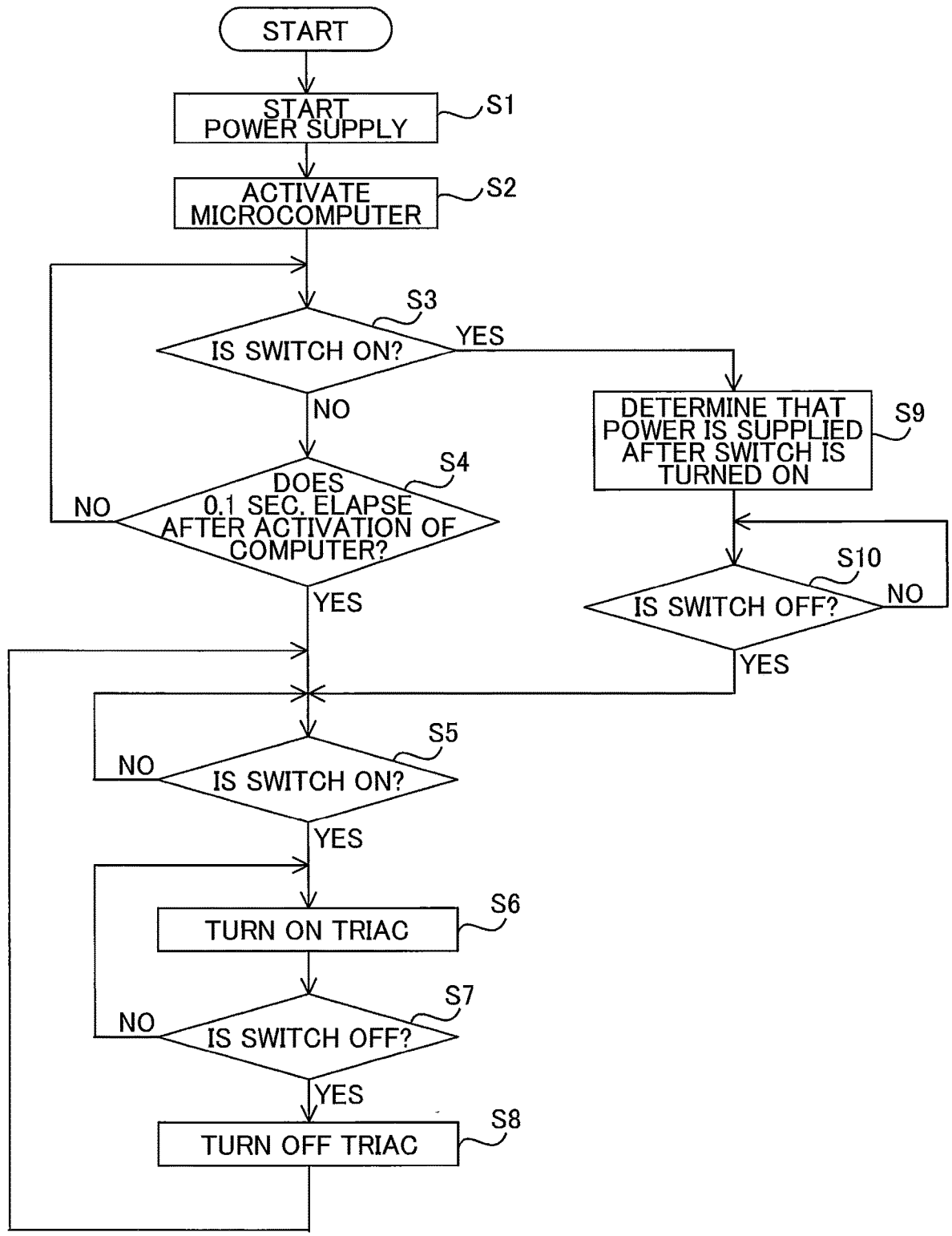
[FIG. 4] A flowchart illustrating operations of a switching unit shown in FIG. 3.

The restart prevention function by the switch unit 11 will be described with reference to FIG. 4.

In Step S1, when the power cord 5 is connected to the commercial power supply PS, the power feeding to the current path IP is started. As illustrated in FIG. 3, Vcc2 is generated in the motor control unit 18 and then applied to the control power-supply circuit 70 when the power feeding is started. This operation enables power feeding from the control power-supply circuit 70 to activate the microcomputer 90. The microcomputer 90 then maintains the switching element 21 in the ON state by means of the transistor 92.

When the switching element 21 is turned to the ON state, a current flows through the switching element 21 to generate Vcc1 in the switch unit 11. The generated Vcc1 is applied to the control power-supply circuit 40. This operation enables power feeding from the control power-supply circuit 40 to activate the microcomputer 60 (Step S2).

The microcomputer 60 then determines whether the switch 12 is in the ON state (Step S3). If the switch 12 is in the OFF state (Step S3: NO), then the microcomputer 60 proceeds to Step S4 and determines whether the elapsed time from the start of the microcomputer 60 is 0.1 seconds (Step S4). If the elapsed time from the start of the microcomputer 60 is 0.1 seconds (Step S4: YES), then the microcomputer 60 proceeds to Step S5 and determines whether the switch 12 is changed from the OFF state to the ON state. If the switch 12 is in the OFF state and the elapsed time from the start of the microcomputer 60 is 0.1 seconds, then the microcomputer 60 determines that the disk grinder 1 is in a normal operable state where the restart prevention function is not required.

Then, if the switch 12 is changed to the ON state (Step S5: YES), the microcomputer 60 determines that the disk grinder 1 is in the normal state, and turns on the switching element 20 via the transistor 61 (Step S6), thereby closing the current path IP to flow the current through the motor 2 and operate the disk grinder 1.

Then, if the microcomputer 60 determines that the switch 12 is turned off (Step S7: YES), the microcomputer 60 turns off the switching element 20 and stops the operation of the disk grinder 1 (Step S8).

In Step S3, if the switch 12 is in the ON state (Step S3: YES), then the microcomputer 60 determines that the power feeding in Step S1 has been performed after the switch 12 became the ON state, that is, determines that the power feeding in Step S1 is an accidental event which requires the restart prevention function to be activated. Thus, the microcomputer 60 turns off the switching element 20 and cuts off the current path IP to prevent the restart of the motor 2 (Step S9).

Then, if the switch 12 becomes the OFF state (Step S10), the microcomputer 60 determines that the switch 12 is turned to the OFF state by a user, then deactivates the restart prevention function, and returns to the normal-operation mode (Step S5).

Figure 5:
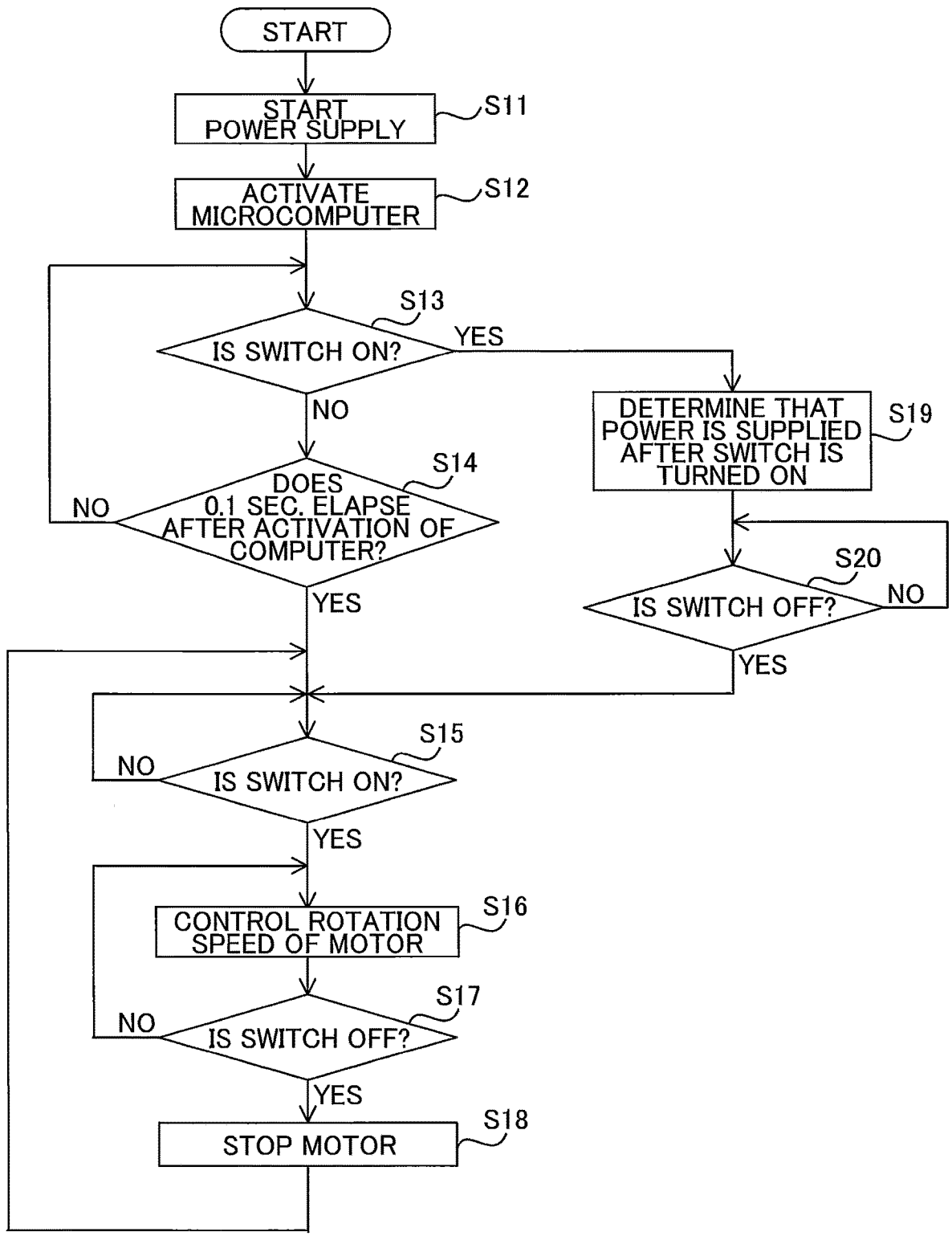
[FIG. 5] A flowchart illustrating operations of a motor control unit shown in FIG. 3.

Next, the restart prevention function by the motor control unit 18 will be described with reference to FIG. 5.

In Step S11, when the power cord 5 is connected to the commercial power supply PS, the power feeding to the current path IP is started. When the power feeding is started, Vcc2 is generated in the motor control unit 18 and applied to the control power-supply circuit 70, as illustrated in FIG. 3. This operation enables power feeding from the control power-supply circuit 70 to activate the microcomputer 90 (Step S12). The microcomputer 90 then turns on the switching element 21 via the transistor 92.

The microcomputer 90 then determines whether the switch 12 is in the ON state (Step S13). If the switch 12 is in the OFF state (Step S13: NO), then the microcomputer 90 proceeds to Step S14 and determines whether the elapsed time from the start of the microcomputer 90 is 0.1 seconds (Step S14). If the elapsed time from the start of the microcomputer 90 is 0.1 seconds (Step S14: YES), then the microcomputer 90 proceeds to Step S15 and determines whether the switch 12 is changed from the OFF state to the ON state (Step S15). If the switch 12 is in the OFF state and the elapsed time from the start of the microcomputer 90 is 0.1 seconds, then the microcomputer 90 determines that the disk grinder 1 is in the normal operable state where the restart prevention function is not required.

Then, if the switch 12 is changed to the ON state (Step S15: YES), the microcomputer 90 determines that the disk grinder 1 is in the normal state to control the rotation of the motor 2 (Step S16) and operate the disk grinder 1.

Then, if the microcomputer 90 detects that the switch 12 is turned off (Step S17: YES), the microcomputer 90 stops the rotation of the motor 2, and then stops the operation of the disk grinder 1 (Step S18).

In Step S13, if the switch 12 is in the ON state (Step S13: YES), then the microcomputer 90 determines that the power feeding in Step S11 has been performed again after the power was shut off due to an accidental event which requires the restart prevention function to be activated. Thus, the microcomputer 90 turns off the switching element 21 and cuts off the current path IP to prevent the restart of the motor 2 (Step S19).

Then, if the switch 12 is turned to the OFF state (Step S20), the microcomputer 90 determines that the switch 12 is returned to the OFF state by a user, then deactivates the restart prevention function, and returns to the normal-operation mode (Step S15).

In this embodiment, both the microcomputer 60 of the switch unit 11 and the microcomputer 90 of the motor control unit 18 monitor the ON and OFF states of the switch 12, and determine the necessity of activation of the restart prevention function, in a dual manner. Therefore, the restart prevention function of the motor 2 can be reliably achieved. In addition, workpieces can be prevented from accidentally damaged.

Next, a second embodiment of the circuit configuration of the disk grinder 1 will be described with reference to FIG. 6.

Figure 6:
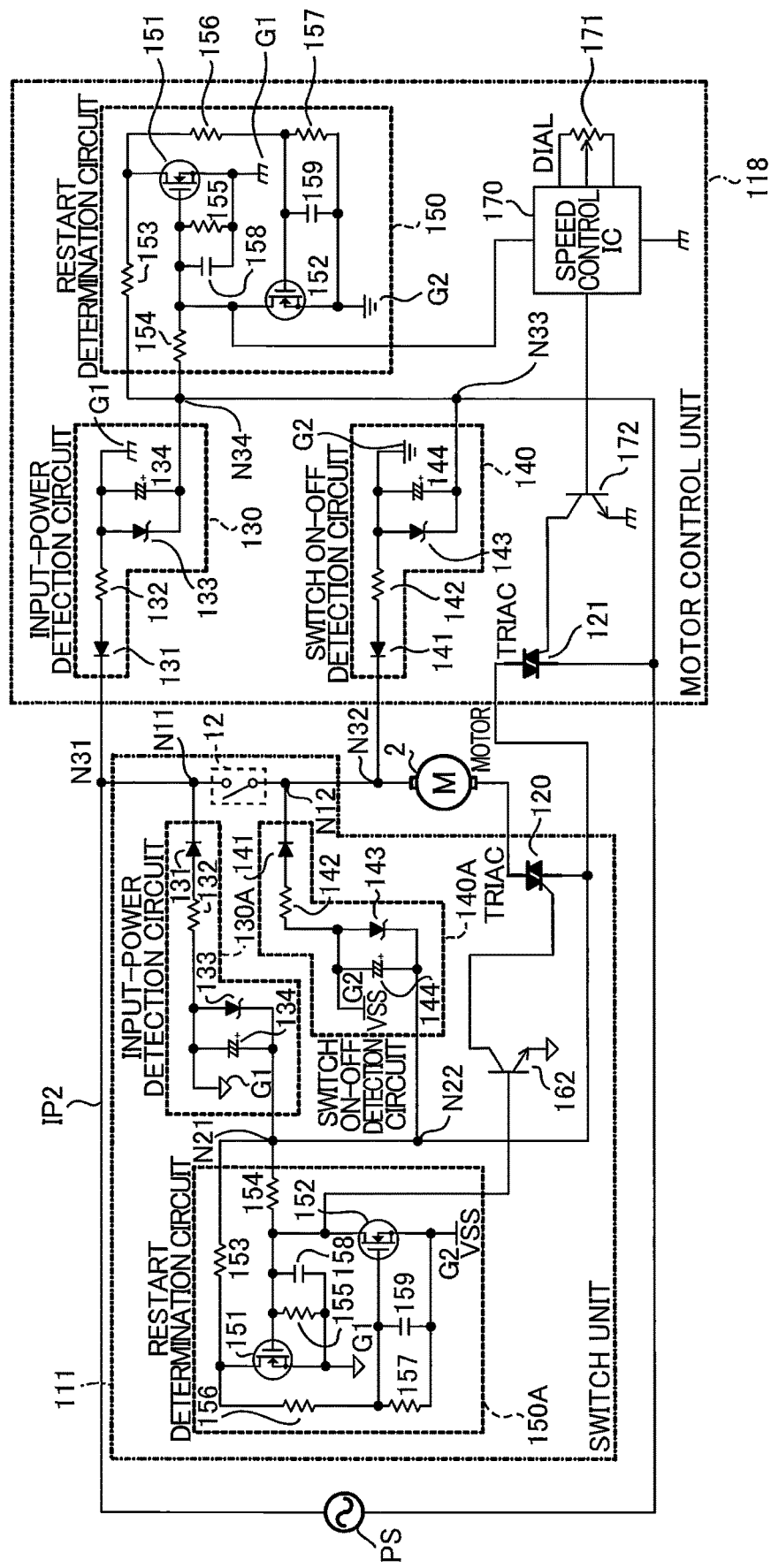
[FIG. 6] A circuit diagram showing an electric configuration of a disk grinder of a second embodiment according to the present invention.

As illustrated in FIG. 6, the commercial power supply PS, a switch unit 111, and the motor 2 are connected in series to form a current path IP2 for the motor 2. The commercial power supply PS serves as a power supply. The motor 2 is connected to a motor control unit 118 which controls the rotation of the motor 2.

The motor control unit 118 includes a switching element 121, an input-power detection circuit 130, a switch-on-and-off detection circuit 140, a restart determination circuit 150, and a speed control IC 170.

The switching element 121 is constituted by a triac. The switching element 121 is connected in series with the switch 12, the motor 2, and the switching element 120 of the switch unit 111 in this order to form a current path IP2 including the commercial power supply PS.

The input-power detection circuit 130, which is one example of power feeding detection means, includes a diode 131, a resistor 132, a zener diode 133, and a capacitor 134. The cathode of the zener diode 133 is connected to a node N34. The anode of the zener diode 133 is connected to a first reference potential G1, and to the anode of the diode 131 via the resistor 132. The cathode of the diode 131 is connected to a node N31 of the current path IP2. The zener diode 133 is connected in parallel to the capacitor 134. When a voltage equal to or larger than a breakdown voltage of the zener diode 133 is applied to the node N34, a constant voltage appears between the node N34 and the first reference potential G1, so that the input-power detection circuit 130 can detect that the power is supplied to the current path IP2.

The switch-on-and-off detection circuit 140, which is one example of a switch detection means, includes a diode 141, a resistor 142, a zener diode 143, and a capacitor 144. The cathode of the zener diode 143 is connected to a node N33.

The anode of the zener diode 143 is connected to a second reference potential G2, and to the anode of the diode 141 via the resistor 142. The cathode of the diode 141 is connected to a node N32 of the current path IP2. The zener diode 143 is connected in parallel to the capacitor 144. In a state where the commercial power supply PS is connected to the current path IP2 and the switch 12 is in the ON state, when a voltage equal to or larger than a breakdown voltage of the zener diode 143 is applied between the node N33 and the second reference potential G2, a constant voltage appears between the node N33 and the second reference potential G2. Thus, when turning on the switch 12 produces a constant voltage, the switch-on-and-off detection circuit 140 can detect the ON and OFF states of the switch 12.

The restart determination circuit 150, which serves as a restart prevention means, includes FETs 151 and 152, resistors 153, 154, 155, 156, and 157, and capacitors 158 and 159; and determines whether the motor 2 can be restarted, depending on the states of the input-power detection circuit 130 and the switch-on-and-off detection circuit 140.

In the restart determination circuit 150, the drain of the FET 151 is connected to the node N34 via the resistor 153, and to the second reference potential G2 via the series-connected resistor 156 and capacitor 159. The source of the FET 151 is connected to the first reference potential G1, and the gate of the FET 151 is connected to the node N34 via the resistor 154. The capacitor 158 and the resistor 155 are connected in parallel. The parallel-connected capacitor 158 and resistor 155 are connected between the gate and the source of the FET 151. When a voltage is applied between the node N34 and the first reference potential G1, the FET 151 is turned on by a gate voltage which rises with a first time constant determined by the resistor 154 and the capacitor 158.

The drain of the FET 152 is connected to the node N34 via the resistor 154, the source of the FET 152 is connected to the second reference potential G2, and the gate of the FET 152 is connected to the drain of the FET 151 via the resistor 156. The capacitor 159 and the resistor 157 are connected in parallel. The parallel-connected capacitor 159 and resister 157 are connected between the gate and the source of the FET 152. When a voltage is applied between the node N34 and the second reference potential G2, the FET 152 is turned on by a gate voltage which rises with a second time constant determined by the resistor 156 and the capacitor 159. Here, it is noted that the second time constant is set smaller than the first time constant.

The speed control IC 170 has a dial 171 which is set through an operation by a user. The speed control IC 170 controls ON and OFF of the switching element 121 in accordance with a setting of the dial 171 and the output from the restart determination circuit 150. When a high signal is outputted from the restart determination circuit 150, the speed control IC 170 determines that the disk grinder 1 is in an normal-operation mode, turns on the switching element 121 via a transistor 172, and sets the number of rotations of the motor 2 in accordance with a setting of the dial 171. On the other hand, when a low signal is outputted from the restart determination circuit 150, the speed control IC 170 determines that the disk grinder 1 in an operation mode in which the restart prevention function of the motor is required to be activated, and then turns off the switching element 121 via the transistor 172.

The switch unit 111 includes a switching element 120. As well as the motor control unit 118, the switch unit 111 also includes an input-power detection circuit 130A, a switch-on-and-off detection circuit 140A, and a restart determination circuit 150A.

The switching element 120 is constituted by a triac, and connected in series with the switching element 121 of the motor control unit 118 in the current path IP2.

Since the input-power detection circuit 130A has the same configuration as the input-power detection circuit 130 of the motor control unit 118, the detailed description of the input-power detection circuit 130A will be omitted. The input-power detection circuit 130A is connected to the current path IP2 at a node N11.

Since the switch-on-and-off detection circuit 140A has the same configuration as the switch-on-and-off detection circuit 140 of the motor control unit 118, the detailed description of the switch-on-and-off detection circuit 140A will be omitted. The switch-on-and-off detection circuit 140A is connected to the current path IP2 at nodes N12 and N22.

Since the restart determination circuit 150A, which serves as restart prevention means, has the same configuration as that of the restart determination circuit 150 of the motor control unit 118, the detailed description of the restart determination circuit 150A will be omitted. The drain of the FET 152 is connected to the base of a transistor 162. The switching element 120 is turned on or off by the output from the restart determination circuit 150A via the transistor 162.

Next, the restart prevention function by the motor control unit 118 will be described.

In the normal-operation mode, the switch 12 is in the OFF state. When the power cord 5 is connected to the commercial power supply PS in this state, power feeding to the current path IP2 is started. When the power feeding is started, current flows in the input-power detection circuit 130 of the motor control unit 118 as illustrated in FIG. 6, so that the power feeding is detected. On the other hand, as no current flows in the switch-on-and-off detection circuit 140, the switch-on-and-off detection circuit 140 detects the OFF state of the switch 12. In the restart determination circuit 150, a potential difference equal to a breakdown voltage of the zener diode 133 occurs between the node N34 and the first reference potential G1, and a gate voltage occurs between the gate and the source of the FET 151. As a result, the FET 151 is turned on. On the other hand, since the FET 152 is kept in the OFF state, the high signal is outputted from the restart determination circuit 150 to the speed control IC 170, so that the switching element 121 is turned on.

In this time, since the switching element 121 is in the ON state, current flows in the input-power detection circuit 130A, so that the power feeding is detected. The switch-on-and-off detection circuit 140A detects the OFF state of the switch 12. Thus, in the restart determination circuit 150A, since the FET 151 becomes the ON state and the FET 152 becomes the OFF state, the switching element 120 is kept in the ON state via the transistor 162. Thus, when a user turns on the switch 12, the current path IP2 is closed and then the motor 2 is driven.

When power fails or the power cord 5 is unplugged for example, the power feeding is shut off. When the power feeding is shut off while the switch 12 is in the ON state, the restart prevention function is required. Next, an operation performed in such a case will be described.

In the case where the restart prevention function is required to be activated, the switch 12 is in the ON state. Thus, when power feeding from the commercial power supply PS is restarted, current flows in both of the input-power detection circuit 130 and the switch-on-and-off detection circuit 140 of the motor control unit 118, as illustrated in FIG. 6. As a result, the power feeding and the ON state of the switch 12 are detected. At this time, the FET 152 having the smaller time constant for the gate becomes the ON state, earlier than the FET 151. When the FET 152 is turned on, the gate of the FET 151 has the second reference potential G2. Thus, the FET 151 cannot be turned on, and is kept in the OFF state. That is, in the restart determination circuit 150, the FET 152 is turned on earlier, and the FET 151 is kept in the OFF state. As a result, since the low signal is received by the speed control IC 170, the switching element 121 is turned off to cut off the current path IP2.

Also in the switch unit 111, current flows in both of the input-power detection circuit 130A and the switch-on-and-off detection circuit 140A, and then the power feeding and the ON state of the switch 12 are detected. With this operation, in the restart determination circuit 150A, the FET 152 is turned on earlier, and the FET 151 is kept in the OFF state. As a result, since a low signal is received by the transistor 162, the switching element 120 is turned off to cut off the current path IP2.

As described above, when the power supply is restarted while the switch 12 is in the ON state, the drive of the motor 2 is prevented by both of the switch unit 111 and the motor control unit 118.

In addition, even in a case where an accidental event causes the motor control unit 118 to fail to open the switching element 121 when the restart prevention function is required to be activated, the switching element 120 of the switch unit 111 is opened to cut off the current path IP2. Therefore, the restart prevention function of the motor 2 is reliably prevented.

Next, a third embodiment of the circuit configuration of the disk grinder 1 will be described with reference to FIG. 7.

Figure 7:
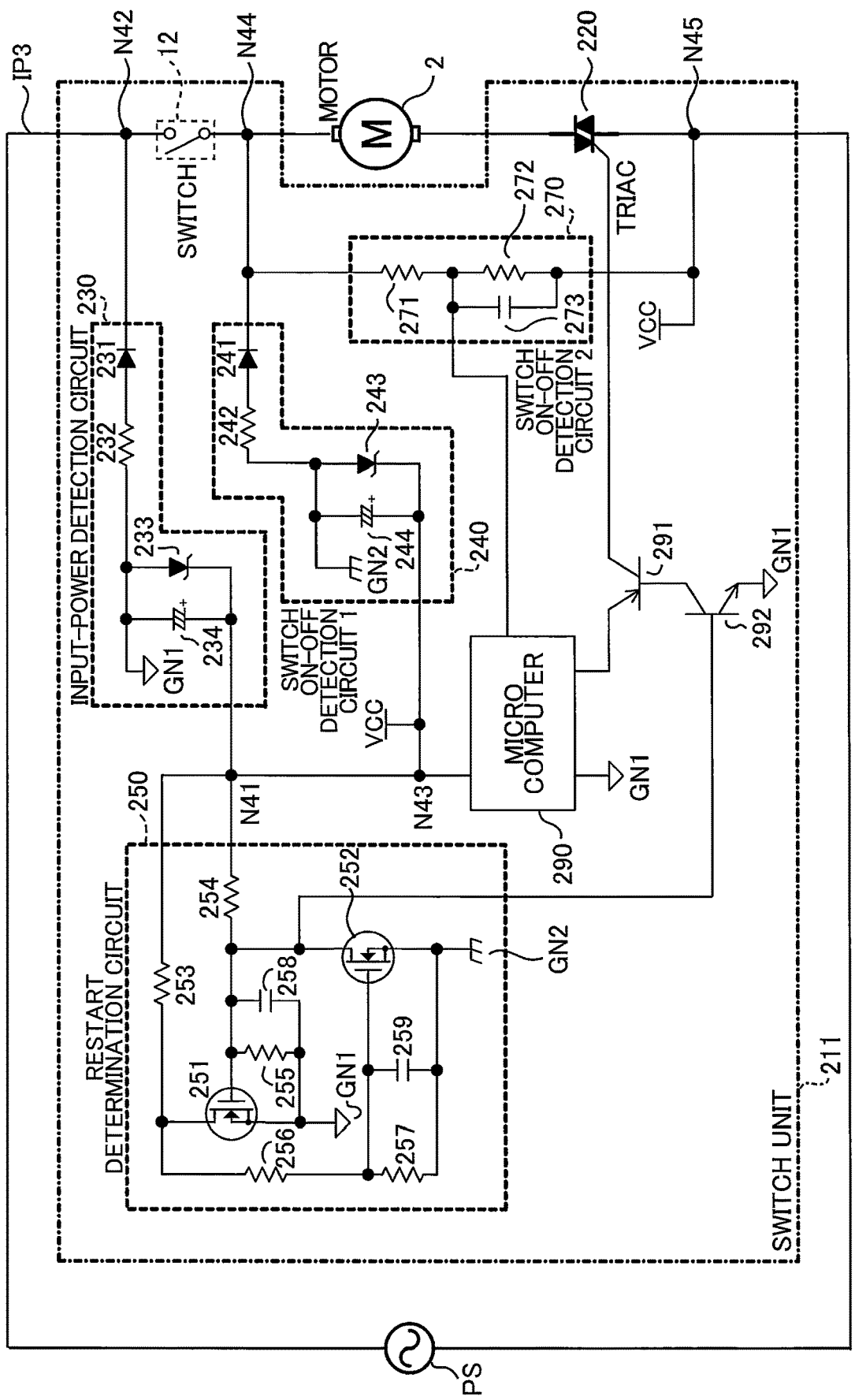
[FIG. 7] A circuit diagram showing an electric configuration of a disk grinder of a third embodiment according to the present invention.

As illustrated in FIG. 7, the commercial power supply PS, which serves as a power supply, and a switch unit 211 and the motor 2 are connected in series to form a current path IP3 for the motor 2.

The switch unit 211 includes the switch 12, a switching element 220, an input-power detection circuit 230, a first switch-on-and-off detection circuit 240, a second switch-on-and-off detection circuit 270, a restart determination circuit 250, and a microcomputer 290.

The switching element 220 is constituted by a triac. The switch 12, the motor 2, and the switching element 220 are connected in series in this order to form the current path IP3 including the commercial power supply PS.

The input-power detection circuit 230 includes a diode 231, a resistor 232, a zener diode 233, and a capacitor 234. The cathode of the zener diode 233 is connected to a node N41. The anode of the zener diode 233 is connected to a first reference potential GN1, and to the anode of the diode 231 via the resistor 232. The cathode of the diode 231 is connected to a node N42 of the current path IP3. The zener diode 233 is connected in parallel to the capacitor 234. When a voltage equal to or larger than a breakdown voltage of the zener diode 233 is applied to the node N41, a constant voltage appears between the node N41 and the first reference potential GN1, so that the input-power detection circuit 230 can detect that the power is supplied to the current path IP3.

The first switch-on-and-off detection circuit 240 includes a diode 241, a resistor 242, a zener diode 243, and a capacitor 244. The cathode of the zener diode 243 is connected to a node N43. The anode of the zener diode 243 is connected to a second reference potential GN2, and to the anode of the diode 241 via the resistor 242. The cathode of the diode 241 is connected to a node N44 of the current path IP3. The zener diode 243 is connected in parallel to the capacitor 244. In a state where the commercial power supply PS is connected to the current path IP3 and the switch 12 is in the ON state, when a voltage equal to or larger than a breakdown voltage of the zener diode 243 is applied to the node N43, a constant voltage appears between the node N43 and the second reference potential GN2. Thus, with the constant voltage produced by turning on the switch 12, the first switch-on-and-off detection circuit 240 can detect the ON and OFF states of the switch 12.

The second switch-on-and-off detection circuit 270 includes resistors 271 and 272, and a capacitor 273. The resistors 271 and 272 are connected in series. In addition, the series-connected resistors 271 and 272 are connected in parallel with the motor 2 between nodes N44 and N45. The capacitor 273 is connected in parallel with the resistor 272. During the drive of the motor 2, the second switch-on-and-off detection circuit 270 outputs a divided value of a motor voltage to the microcomputer 290. The second switch-on-and-off detection circuit 270 can detect the motor voltage to determine the ON and OFF states of the switch 12.

The restart determination circuit 250, which serves as a restart prevention means, includes FETs 251 and 252, resistors 253, 254, 255, 256, and 257, and capacitors 258 and 259; and determines whether the motor 2 can be restarted, depending on the states of the input-power detection circuit 230 and the first switch-on-and-off detection circuit 240.

In the restart determination circuit 250, the drain of the FET 251 is connected to the node N41 via the resistor 253, and to the second reference potential GN2 via the series-connected resistor 256 and capacitor 259. The source of the FET 251 is connected to the first reference potential GN1, and the gate of the FET 251 is connected to the node N41 via the resistor 254. The capacitor 258 and the resistor 255 are connected in parallel. The parallel-connected capacitor 258 and resistor 255 are connected between the gate and the source of the FET 251. When a voltage is applied between the node N41 and the first reference potential GN1, the FET 151 is turned on by a gate voltage which rises with a first time constant determined by the resistor 254 and the capacitor 258.

The drain of the FET 252 is connected to the node N41 via the resistor 254, the source of the FET 252 is connected to the second reference potential GN2, and the gate of the FET 252 is connected to the drain of the FET 251 via the resistor 256. The capacitor 259 and the resistor 257 are connected in parallel. The parallel-connected capacitor 259 and resistor 257 and connected between the gate and the source of the FET 252. When a voltage is applied between the node N41 and the second reference potential GN2, the FET 252 is turned on by the gate voltage which rises with a second time constant set by the resistor 256 and the capacitor 259. Here, the second time constant is set smaller than the first time constant.

The microcomputer 290 is connected to the node N43 and the first reference potential GN1.

The drain of the FET 252 is connected to the base of a transistor 292. The collector of the transistor 292 is connected to the base of a transistor 291. The emitter of the transistor 291 is connected to the microcomputer 290, and the collector of the transistor 291 is connected to the switching element 220. The transistor 291 controls ON and OFF of the switching element 220.

The restart prevention function by the switch unit 211 will be described.

In the normal-operation mode, the switch 12 is in the OFF state. When the power cord 5 is connected to the commercial power supply PS in this state, power feeding to the current path IP3 is started. When the power feeding is started, Vcc is generated in the switch unit 211, as illustrated in FIG. 7. With the generation of Vcc, current flows in the input-power detection circuit 230 to start power feeding to the microcomputer 290. In the restart determination circuit 250, a potential difference equal to a breakdown voltage of the zener diode 233 appears between the node N41 and the first reference potential GN1, and a gate voltage occurs between the gate and the source of the FET 251. Therefore, the FET 251 is turned on. On the other hand, no current flows in the first switch-on-and-off detection circuit 240, and the second switch-on-and-off detection circuit 270 detects the OFF state of the switch 12. Thus, in the restart determination circuit 250, since the FET 252 keeps its OFF state, a high signal is applied to the base of the transistor 292 and the transistor 292 is then turned on. As a result, the transistor 291 is turned on, and then a signal from the microcomputer 290 is sent to the switching element 220. As a result, the switching element 220 is turned on, so that the motor 2 is driven.

When power fails or the power cord 5 is unplugged for example, the power feeding is shut off. When the power feeding is shut off while the switch 12 is in the ON state, the restart prevention function is required. Next, an operation performed in such a case will be described.

In the case where the restart prevention function is required to be activated, the switch 12 is in the ON state. Thus, when power feeding from the commercial power supply PS is restarted, current flows in both of the input-power detection circuit 230 and the first switch-on-and-off detection circuit 240 of the switch unit 211, as illustrated in FIG. 7. As a result, the power feeding and the ON state of the switch 12 are detected. At this time, the FET 252 having the smaller time constant for the gate is turned on earlier than the FET 251. When the FET 252 is turned on, the potential of the drain of the FET 252 becomes equal to the second reference potential GN2. As a result, the transistor 291 is turned off via the transistor 292, and the switching element 220 is then turned off. Therefore, the current path IP3 is cut off, and then the restart of the motor 2 is prevented.

As described above, the restart determination circuit 250 determines the necessity of activation of the restart prevention function, and the microcomputer 290 sets the OFF state of the switching element 220 depending on a result of the determination. Thus, the restart of the motor 2 that is caused by the power feeding performed when the switch 12 is in the ON state, can be reliably prevented.

In addition, even when the determination by the restart determination circuit 250 is not performed, the microcomputer 290 determines the necessity of activation of the restart determination function in response to the output from the second switch-on-and-off detection circuit 270, which operates independently of the restart determination circuit 250. Therefore, the restart of the motor 2 can be reliably prevented.

Next, a fourth embodiment of the circuit configuration of the disk grinder 1 will be described with reference to FIG. 8.

Figure 8:
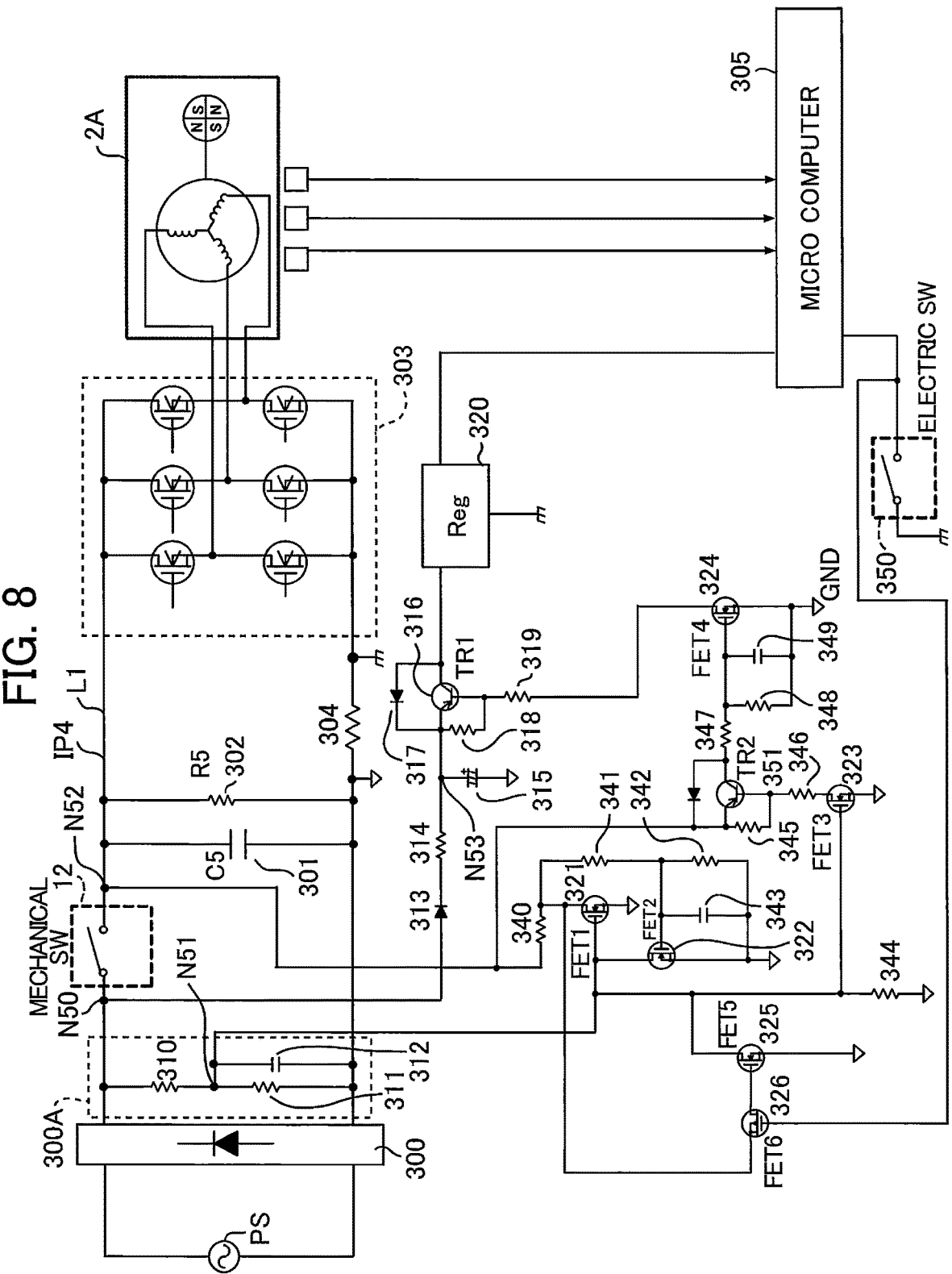
[FIG. 8] A circuit diagram showing an electric configuration of a disk grinder of a fourth embodiment according to the present invention.

As illustrated in FIG. 8, the commercial power supply PS, which serves as a power supply, a rectifying circuit 300, an inverter circuit 303, and a brushless motor 2A are connected in this order. In addition, a microcomputer 305 is provided to control the drive of the brushless motor 2A.

Between the rectifying circuit 300 and the inverter circuit 303, the switch 12, a control power-supply circuit 300A, a motor current detection resistor 304, a capacitor 301, and a resistor 302 are provided. The switch 12 serves as a first switch to turn on and off the power feeding to the brushless motor 2A. The control power-supply circuit 300A includes resistors 310 and 311, and a capacitor 312.

A node N50 of a high-potential line L1 of a current path IP4 is connected to the anode of a diode 313. The cathode of the diode 313 is connected to a microcomputer power supply 320 via a resistor 314 and a transistor 316. Here, the microcomputer power supply 320 is one example of a power generation circuit.

The microcomputer 305 is supplied with power from the microcomputer power supply 320, and is activated when an electronic switch 350 is turned on. The microcomputer 305 controls switching operations of the inverter circuit 303 on the basis of the output from Hall devices disposed in the brushless motor 2A, and thereby controls power feeding to the brushless motor 2A.

The electronic switch 350 serves as a second switch, and is constituted by a microswitch which operates simultaneously with the switch 12. The emitter of the transistor 316 is connected to the cathode of a diode 317, and the collector of the transistor 316 is connected to the anode of the diode 317. The base of the transistor 316 is connected to a reference potential GND via a resistor 319 and an FET 324. In addition, a resistor 318 is connected between the emitter and the base of the transistor 316. Furthermore, a capacitor 315 is connected between the reference potential GND and a node N53 between the resistor 314 and the transistor 316.

The power to the microcomputer power supply 320 is supplied from the high-potential line L1 through the diode 313 and the resistor 314 when the transistor 316 is turned on.

The control of ON and OFF of the transistor 316 is performed by a circuit including FETs 321, 322, 323, 324, 325, and 326, resistors 340, 341, 342, 344, 345, 346, 347, and 348, and capacitors 343 and 349. The circuit functions as a restart prevention means.

The drain of the FET 321 is connected to a node N52 of the high-potential line L1 via the resistor 340; the source of the FET 321 is connected to the reference potential GND; the gate of the FET 321 is connected a node N51 which connects a resistor 310 and a resistor 311. The gate voltage of the FET 321 rises with a first time constant determined by the resistor 310 and the capacitor 312.

The drain of the FET 322 is connected to the node N51; the source of the FET 322 is connected to the reference potential GND; the gate of the FET 322 is connected to the node N52 of the high-potential line L1 via the resistors 341 and 340. The capacitor 343 and the resistor 342 are connected in parallel, and the parallel-connected capacitor 343 and resistor 342 are connected between the gate and the source of the FET 322. The gate voltage of the FET 322 rises with a second time constant determined by the resistor 341 and the capacitor 343. Here, the second time constant is set smaller than the first time constant.

The drain of the FET 323 is connected to the node N52 via the resistors 346 and 345; the source of the FET 323 is connected to the reference potential GND; the gate of the FET 323 is connected to the node N51.

The drain of the FET 324 is connected to the base of the transistor 316 via the resistor 319; the source of the FET 324 is connected to the reference potential GND; the gate of the FET 324 is connected to the node N52 via the resistor 347 and the collector and the emitter of the transistor 351. The capacitor 349 and the resistor 348 are connected in parallel, and the parallel-connected capacitor 349 and resistor 348 are connected between the gate and the source of the FET 324.

The drain of the FET 325 is connected to the node N51; the source of the FET 325 is connected to the reference potential GND; the gate of the FET 325 is connected to the drain of the FET 321 via the source and the drain of the FET 326.

The gate of the FET 326 is connected to a terminal of the electronic switch 350 on the high potential side.

In the normal state, the switch 12 is in the OFF state when power is fed. When the power is fed while the switch 12 is in this state, a gate voltage is applied to the FET 321 and the FET 323. After that, when the switch 12 and the electronic switch 350 are simultaneously turned on, the FET 326 and the FET 325 are turned off, the FET 321 and the FET 323 are turned on, and the FET 322 is turned off. As a result, current flows in the FET 321 and the FET 323 via the node N52, respectively. When the FET 323 is turned on, the transistor 351 is turned on, a gate voltage is applied to the FET 324, and then the FET 324 is turned on. When the FET 324 is turned on, the transistor 316 is turned on and the power is supplied through the node N50 to the microcomputer power supply 320. As a result, the power feeding to the microcomputer 305 is started, then the microcomputer 305 is activated. Accordingly, the brushless motor 2A is allowed to be rotated.

On the other hand, when the power is fed while the switch 12 and the electronic switch 350 are in the ON state, the FET 322 is turned on earlier, because the second time constant for the gate voltage of the FET 322 is smaller than the first time constant for the gate voltage of the FET 321. As a result, the FET 321 is turned off. Since the FET 322 is turned on, the FET 323 is turned off and the transistor 351 is turned off. Thus, since the gate voltage is not applied to the FET 324, the FET 324 is turned off and the transistor 316 is also turned off. As a result, the power feeding to the microcomputer power supply 320 is not performed. Therefore, since the microcomputer 305 is not activated, the restart of the brushless motor 2A is prevented.

In this manner, when power is fed while the switch 12 is in the ON state, the power feeding to the microcomputer 305 is not performed, and then the restart of the microcomputer 305 is prevented. Therefore, the restart of the brushless motor 2A can be reliably prevented.

In addition, like the microcomputer 90 of the first embodiment, when the power feeding from the microcomputer power supply 320 to the microcomputer 305 is started, and at substantially the same time, when the microcomputer 305 detects the ON state of the electronic switch 350 that interlocks with the switch 12, the microcomputer 305 determines that the power feeding has been performed again after the power was shut off due to an accidental event, and that the restart prevention function is required to be activated. As a result, the microcomputer 305 does not allow the inverter circuit 303 to perform switching operation. Therefore, since the power feeding to the brushless motor 2A is not performed, the restart of the motor 2 can be reliably prevented.

Thus, even when the power feeding to the microcomputer 305 is performed after an accidental event occurs in a circuit for the transistor 316 in which whether to perform the power feeding to the microcomputer power supply 320 is determined, the microcomputer 305 detects the ON state of the switch 12 independently, and then does not feed power to the brushless motor 2A. Therefore, the restart of the brushless motor 2A is reliably prevented.

Figure 9:
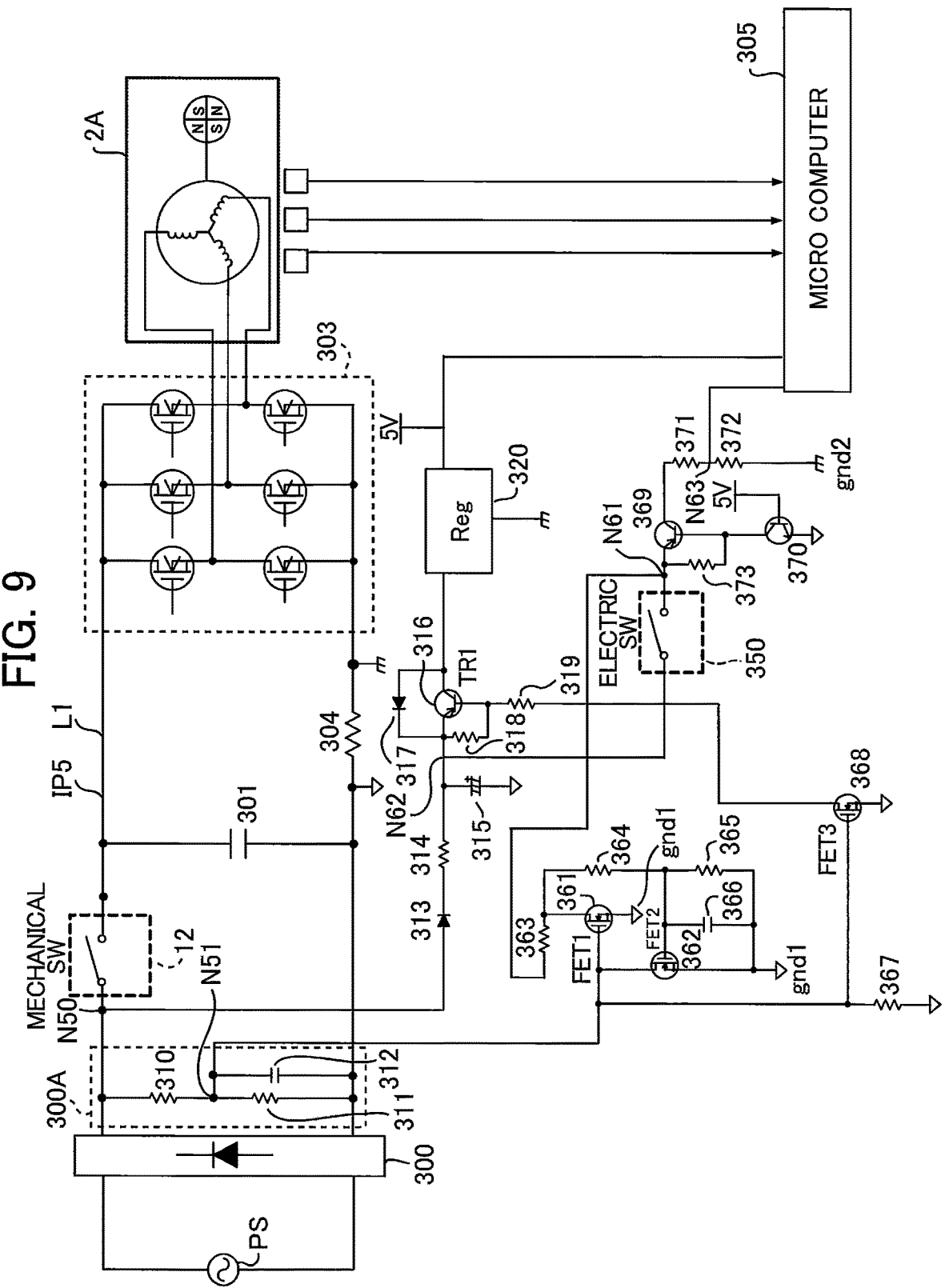
[FIG. 9] A circuit diagram showing an electric configuration of a disk grinder of a fifth embodiment according to the present invention.

Next, a fifth embodiment of the circuit configuration of the disk grinder 1 will be described with reference to FIG. 9. As illustrated in FIG. 9, in the circuit configuration of the fifth embodiment, since the following components are the same as those of the fourth embodiment, the detailed description thereof will be omitted. That is, the above-described components are the commercial power supply PS, the rectifying circuit 300, the inverter circuit 303, the brushless motor 2A, the switch 12 switchable between on and off for the power feeding to the brushless motor 2A, the control power-supply circuit 300A, the motor current detection resistor 304, the capacitor 301, and components disposed between the node N50 of the high-potential line L1 of the current path IPS and the microcomputer power supply 320. The control power-supply circuit 300A includes the resistors 310 and 311, and the capacitor 312. The components between the node N50 and the microcomputer power supply 320 are the diode 313, the resistor 314, the capacitor 315, the transistor 316, the diode 317, and the resistors 318 and 319.

An electronic switch 350 and a transistor 369 are connected in series between a second reference potential gnd2 and a node N62 positioned between the emitter of the transistor 316 and the resistor 314.

The control of ON and OFF of the transistor 316 is performed by a circuit including FETs 361, 362, and 368, resistors 363, 364, 365, 367, 371, 372, and 373, a capacitor 366, and transistors 369 and 370. The circuit functions as a restart prevention means.

The drain of the FET 361 is connected to a node N61, positioned between the electronic switch 350 and the emitter of the transistor 369, via the resistor 363; the source of the FET 361 is connected to a first reference potential gnd1; the gate of the FET 361 is connected to the node N51 which connects the resistor 310 and the resistor 311. The gate voltage of the FET 361 rises with a first time constant determined by the resistor 310 and the capacitor 312.

The drain of the FET 362 is connected to the node N51 and the gate of the FET 361; the source of the FET 362 is connected to the first reference potential gnd1; the gate of the FET 362 is connected to the node N61 via the resistors 364 and 363. The capacitor 366 and the resistor 365 are connected in parallel, and the parallel-connected capacitor 366 and the resistor 365 are connected between the gate and the source of the FET 362. The gate voltage of the FET 362 rises with a second time constant determined by the resistor 364 and the capacitor 366. Here, the second time constant is set smaller than the first time constant.

The drain of the FET 368 is connected to the base of the transistor 316 via the resistor 319; the source of the FET 368 is connected to the first reference potential gndl; the gate of the FET 368 is connected to the node N51, and to the first reference potential gndl via the resistor 367.

The resistors 371 and 372 are connected in series between the collector of the transistor 369 and a second reference potential gnd2. The node N63 between the resistors 371 and 372 is connected to the microcomputer 305. The resistor 373 is connected between the emitter and the base of the transistor 369, and the base of the transistor 369 is connected to the first reference potential gndl via the transistor 370.

Under the normal state, the switch 12 is in the OFF state when the feeding of the power is started. When the power is fed in this state, a gate voltage is applied to the FET 361 and the FET 368. After that, when the switch 12 and the electronic switch 350 are simultaneously turned on, the FET 361 is turned on, the FET 362 is turned off, and the FET 368 is turned on. As a result, the transistor 316 is turned on, and power is supplied through the node N50 to the microcomputer power supply 320. Thus, since the power feeding to the microcomputer 305 is started to activate the microcomputer 305, and the ON state of the electronic switch 350 is detected by the microcomputer 305, the brushless motor 2A is allowed to be rotated.

On the other hand, when power is fed while the switch 12 and the electronic switch 350 are in the ON state, the FET 362 is turned on earlier, because the second time constant for the gate voltage of the FET 362 is smaller than the first time constant for the gate voltage of the FET 361. As a result, the FET 368 is turned off and the transistor 316 is turned off Thus, the power feeding to the microcomputer power supply 320 is not performed. Therefore, since the microcomputer 305 is not activated, the restart of the brushless motor 2A is prevented regardless of ON or OFF of the electronic switch 350.

In this manner, when power is fed while the switch 12 is in the ON state, the restart of the microcomputer 305 is prevented. Therefore, the restart of the brushless motor 2A can be reliably prevented.

In addition, like the microcomputer 90 of the first embodiment, when the power feeding from the microcomputer power supply 320 to the microcomputer 305 is started, and at the substantially same time, when the microcomputer 305 detects the ON state of the electronic switch 350 interlocked with the switch 12, the microcomputer 305 determines that the power feeding has been performed again after the power was shut off due to an accidental event in which the restart prevention function is required to be activated. Therefore, the microcomputer 305 does not cause the inverter circuit 303 to perform switching operation. Thus, since the power feeding to the brushless motor 2A is not performed, the restart of the motor 2 can be reliably prevented.

Thus, even when the power feeding to the microcomputer 305 is performed after an accidental event occurs in a circuit for the transistor 316 which sets whether to perform the power feeding to the microcomputer power supply 320, the microcomputer 305 detects the ON state of the switch 12 independently via the electronic switch 350, and does not feed power to the brushless motor 2A. Therefore, the restart can be reliably prevented.

As described above, the present invention includes two restart prevention means, each of which determines whether the motor can be restarted. Therefore, the restart prevention function for the motor can be reliably achieved.

REFERENCE SINGS LIST

1 . . . disk grinder, 2 . . . motor, 12 . . . switch, 60, 90, 150, 150A, 250, and 305 . . . restart prevention means

The invention claimed is:

1. A power tool comprising:
a motor;
a switch switchable between an ON position and an OFF position by an operator, the ON position causing the motor to be driven, the OFF position causing the motor to be stopped; and
first and second restart prevention circuits for preventing the motor from being driven in a case where power supplied to the motor falls below or to a predetermined value, until the switch is switched again to the ON position,
wherein each of the first and second restart prevention circuits is configured to determine whether the motor can be restarted.

2. The power tool according to claim 1, further comprising on-lock mechanism for maintaining the switch to the ON position.

3. The power tool according to claim 1, wherein the first restart prevention circuit comprises a microcomputer for controlling driving of the motor.

4. The power tool according to claim 1, wherein the second restart prevention circuit comprises a switch unit physically integrated with the switch, the switch unit comprising a switching element connected in series with a current path to the motor for turning on and off power supply to the motor,
wherein by turning off the switching element, the power supply to the motor is stopped until the switch is turned again to the ON position.

5. The power tool according to claim 4, wherein the second restart prevention circuit comprises a microcomputer provided internally of the switch unit.

6. The power tool according to claim 3, wherein the second restart prevention circuit is provided on an input side of a power generation circuit for generating power to be supplied to the microcomputer, and power supply to the power generation circuit is stopped until the switch is turned again to the ON position.

7. The power tool according to claim 6, further comprising an inverter circuit for outputting power to the motor,
wherein the switch comprises a first switch and a second switch, the first switch being switchable between an ON position at which power supply to the inverter circuit is allowed and an OFF position at which the power supply to the inverter circuit is stopped, the second switch being switchable between an ON position at which operation of the microcomputer is allowed and an OFF position at which the operation of the microcomputer is not allowed,
wherein the microcomputer controls power supply from the inverter circuit to the motor to control drive of the motor, and
wherein the second restart prevention circuit stops power supply to the power generation circuit until the second switch is turned again to the ON position.

8. A power tool comprising:
a motor;
an inverter circuit for outputting power to the motor;
a microcomputer for controlling the inverter circuit;
a first switch switchable between an ON state and an OFF state by an operator, the ON state being for allowing power supply to the inverter circuit, the OFF state being for stopping the power supply to the motor;
a second switch switchable between an ON state and an OFF state by an operator, the ON state being for allowing operation of the microcomputer, the OFF state being for stopping the operation of the microcomputer;
an on-lock mechanism for maintaining the first switch on the ON state; and
a restart prevention circuit for stopping the power supply to the microcomputer in a case where power supplied to the motor falls below or to a predetermined value, until the first switch is turned again to the ON state.

9. The power tool according to claim 8, further comprising a power generation circuit for supplying power to the microcomputer,
wherein the second switch is provided between the power generation circuit and the microcomputer, and
wherein the restart prevention circuit stops power supply from the power generation circuit to the microcomputer until the second switch is turned again to the ON state.

10. A power tool comprising:
a motor;
a switch switchable between an ON position and an OFF position by an operator, the ON position causing the motor to be driven, the OFF position causing the motor to be stopped; and first and second restart prevention circuits configured to perform restart-preventing-control under a condition that the power supplied to the motor falls below or to the predetermined value, causing the motor driving to stop, the restart-prevention-control being such a control for preventing resumption of the motor driving even if the power supplied to the motor restores the power exceeding the predetermined value and even if the switch is held in the ON position, wherein the first and second restart prevention circuits are configured to perform the restart-preventing-control independently of each other.

\* \* \* \* \*